US007798547B2

(12) United States Patent
Antaya

(10) Patent No.: US 7,798,547 B2
(45) Date of Patent: Sep. 21, 2010

(54) PORTABLE PAINT BOOTH

(76) Inventor: Bruce C. Antaya, 32025 Hull Ave., Farmington Hills, MI (US) 48336

( * ) Notice: Subject to any disclaimer, the term of this patent is extended or adjusted under 35 U.S.C. 154(b) by 702 days.

(21) Appl. No.: 11/499,823

(22) Filed: Aug. 4, 2006

(65) Prior Publication Data

US 2007/0056510 A1 Mar. 15, 2007

Related U.S. Application Data

(60) Provisional application No. 60/705,739, filed on Aug. 4, 2005.

(51) Int. Cl.
*B60P 3/34* (2006.01)

(52) U.S. Cl. .................. 296/26.13; 296/163; 296/24.32

(58) Field of Classification Search ................. 296/163, 296/24.3, 24.32, 26.12, 26.13; 52/67; 135/88.07, 135/88.14, 88.16–88.18
See application file for complete search history.

(56) References Cited

U.S. PATENT DOCUMENTS

| | | | | | |
|---|---|---|---|---|---|
| 2,225,319 | A | * | 12/1940 | Rollo | 296/171 |
| 2,706,132 | A | * | 4/1955 | Chaffin | 296/163 |
| 2,811,935 | A | * | 11/1957 | Jones | 52/11 |
| 3,275,369 | A | * | 9/1966 | Ecke | 296/163 |
| 3,719,386 | A | * | 3/1973 | Puckett et al. | 296/26.13 |
| 5,248,180 | A | * | 9/1993 | Hussaini | 296/171 |
| 5,634,683 | A | * | 6/1997 | Young | 296/165 |
| 6,179,513 | B1 | * | 1/2001 | Marasco | 403/374.5 |
| 6,502,893 | B1 | * | 1/2003 | Corliss, Jr. | 296/162 |
| 6,871,897 | B1 | * | 3/2005 | Snyder | 296/26.13 |
| 7,093,888 | B2 | * | 8/2006 | Anderson et al. | 296/162 |
| 7,100,625 | B2 | * | 9/2006 | Valles | 135/88.13 |
| 7,178,536 | B2 | * | 2/2007 | Holtkamp | 135/88.13 |
| 7,344,182 | B1 | * | 3/2008 | Weddell et al. | 296/163 |
| 2005/0160682 | A1 | * | 7/2005 | Quadrio | 52/67 |

* cited by examiner

*Primary Examiner*—Jason S Morrow
(74) *Attorney, Agent, or Firm*—The Weintraub Group, PLC

(57) ABSTRACT

A mobile booth system, carried by a truck or like mobile vehicle, creates a portable, temporary in situ booth or enclosure at a remote location. A pair of side by side slide assemblies are formed by respective nests of C-channels and I-beams, each assembly extending and retracting through an opening in a sidewall of the truck wherein to deploy and retract a roof section outwardly from the truck. The roof section is deployed through a dedicated opening in the sidewall, which opening may be closed by a closure panel but opened by deployment of the roof section. When deployed, an enclosure is formed by attaching a drop cloth to the roof section. The enclosure when used as a paint booth enables rapid deployment of a drop cloth about irregular or difficult surfaces to be painted, as well as to contain overspray and fumes created by the spraying operation.

21 Claims, 4 Drawing Sheets

PORTABLE PAINT BOOTH

CROSS-REFERENCE TO RELATED APPLICATIONS

This is a Completion Application of U.S. Provisional Patent Application Ser. No. 60/705,739, filed Aug. 4, 2005, the entire disclosure of which incorporated herein by reference.

BACKGROUND OF THE INVENTION

1. Field of the Invention

This invention is directed to a mobile booth system that is carried by a truck or like mobile vehicle for creating a temporary in situ enclosure at a remote location, and more particularly, to a portable, temporary, in situ paint booth.

2. Description of Prior Art

Application of paints or chemicals by spraying involves atomizing the paint or chemical using pressurized air, creating a fine mist. This mist is directed towards the surface being painted. Although most of the paint being sprayed adheres to the surface, a certain percentage does not and results in "overspray". A common way to control overspray and contain fumes is by spraying in a confined booth around the work piece. Typically, these booths are isolated, ventilated, and climate controlled.

There are many situations wherein objects need to be painted in situ, either because the objects are permanently or semi-permanently fixed in place or are too heavy or cumbersome for transportation. For example, in the case of large outdoor trash bins used in commercial and apartment house complexes. Either a portable paint booth must be transported to the site and assembled around the object or a tent type covering must be erected. This involves considerable time and expense and often does not provide an optimum covering around the object to be painted or may fail to provide proper ventilation in the painting area.

In other situations, it is often desirable to paint an automobile undergoing restoration while the automobile is not fully mechanically restored, and, thus, is not movable. Furthermore, oftentimes and similarly, it is more convenient to bring the paint booth to the job then the job to the paint booth, especially with respect to planes, boats and other large vehicles.

Erectable, temporary, and portable roofing systems and booth forming structure is known. U.S. Pat. No. 3,811,371 to Hardy; U.S. Pat. No. 5,864,991 to Burns; U.S. Pat. No. 4,532,886 to Blanchard; and U.S. Pat. No. 6,132,509 to Kuschnereit illustrate portable paint spray booth systems. U.S. Pat. No. 5,171,056 to Faludy et al.; and U.S. Pat. No. 5,192,111 to Hanemaayer; and U.S. Pat. No. 5,280,687 to Boltreau illustrate erectable temporary structure, such as from a truck or van. Further, U.S. Pat. No. 5,452,859 to Flaxman illustrates a vehicle washing apparatus.

While the above-noted structures and booth systems may be suitable for the purposes there intended, each has certain deficiencies which are overcome by the paint spray booth system as disclosed hereafter.

SUMMARY OF THE INVENTION

A primary object of this invention is the provision of a truck mounted system which can be transported to any desired location, deployed, and create a temporary enclosure. Desirably, such enclosure, when deployed, is suitable for use as a paint spray booth. Additionally, such deployed enclosure may be adapted to function as a temporary shelter against the elements for persons and goods, or provide a display booth for use at trade shows and like promotional events.

Another object of this invention is the provision of a deployable paint spray booth and like enclosure capable of containing overspray and any fumes created by the spraying operation.

Advantageously, the enclosure of this invention when used as a deployable paint booth enables a drop cloth of the enclosure to be rapidly configured in enclosing relation about irregular or difficult surfaces to be painted, as desired, or enables the booth to be oriented about and relative to an object to be painted, as desired, or enables a vehicle or like object to be painted to be oriented relative to the roof and drop cloth of the truck booth, as desired.

Briefly described, the present invention is a portable mobile paint booth that is transported by a truck for creating an enclosure at a remote location, said paint booth comprising:

a slide roof having a rearward end and three sides, a slide mechanism disposed within the interior of said truck for supporting said slide roof and enabling said slide roof to extend outwardly from and be retracted into the interior of said truck, said slide mechanism placed in juxtaposition with an entrance/exit to the interior of said truck and comprising longitudinally elongated upper and lower C-channels, and a longitudinally extending I-beam having upper and lower webs mounted for relative sliding movement in a respective C-channel, said lower channel fixedly connected to said truck and extending inwardly from said entrance/exit, and said upper C-channel fixedly attached to said slide roof, and a drop cloth which enables the enshrouding of said three sides when the slide roof is extended.

Preferably, in one embodiment, the mobile paint booth includes means for retracting the extended roof back into the interior of said truck. According to this embodiment, the means for retracting comprises a wire rope and pulley system, including a pulley connected to the interior of said truck and a wire rope having opposite end portions, respectively, fixedly connected to the slide roof and associated with the pulley.

Preferably, and another embodiment, the mobile paint booth includes for extending and retracting the roof, such as enabled by a hydraulic piston and electronic control system operably associated with the slidable roof.

Preferably, the mobile paint booth further comprises said truck having four vertical walls extending between a floor and ceiling, the walls including forward and rearward endwalls, first and second sidewalls. The entrance/exit is formed in the first sidewall, below the ceiling, and includes an upper edge proximate to the ceiling and a lower edge distal to the ceiling. In one embodiment, the slide mechanism is supported, at least in part, adjacent to the lower edge of the entrance/exit and the roof slides atop the lower edge. In another embodiment, the slide mechanism is supported, at least in part, from the ceiling and the roof slides inwardly/outwardly relative to the upper edge of the entrance/exit.

According to an aspect of this embodiment, the first sidewall includes and upper and lower panels, the upper panel being fixed to the truck and extending downwardly from the lower edge portion of the entrance/exit, and the lower panel movable relative to the truck between interior open and interior closed positions. In the closed position, the panels form a generally planar surface. In the open position, the lower panel is proximate to and forms an air closure with the ground. Additionally, the drop cloth completes an air closure with the ground, sliding roof and sidewall of the truck.

Preferably, and according to this embodiment of the invention, the truck includes means for transporting paint supplies, such as paint, painting apparatus, such as a paint spray gun for spraying paint, and power means for powering the painting apparatus.

According to another aspect of this embodiment, the truck includes means for heating the paint booth enclosure formed by the slide roof, the drop cloth, and the entrance/exit sidewall of the truck.

According to yet another aspect of this embodiment, the paint booth includes vacuum means for lowering the pressure in the enclosure formed by the slide roof, the drop cloth, and the entrance/exit sidewall of the truck, wherein to withdraw paint fumes and chemicals from the enclosure during a paint operation.

Preferably, and according to this embodiment of the invention, the mobile paint booth comprises a pair of like slide mechanisms placed in juxtaposition with the entrance/exit, one and the other slide mechanism being proximate to a respective lateral end of the entrance/exit and extending along opposite lateral sides of the slide roof.

According to another preferred embodiment of this invention, there is provided a mobile booth system that is carried by a truck for creating an enclosure at a remote location, said truck including an interior formed, at least in part, by laterally spaced generally horizontally disposed floor and ceiling portions and laterally spaced generally vertically disposed first and second vertical sidewalls, said booth system comprising:

said first sidewall being formed, at least in part, by upper and lower panels, an upper passageway between the upper panel and the ceiling portion, and a lower passageway between the upper panel and the bottom of the truck, the passageways each forming an entrance/exit into the interior of the truck, said lower panel being movable between a first position and in closing relation with the lower passageway and a second position wherein the lower panel is moved from closing relation with the lower passageway and truck interior and a lower edge of the lower panel is juxtaposed with and forms, at least in part, an air closure with the ground, a roof assembly fixedly attached to said truck proximate to said upper passageway, the roof assembly extending between said sidewalls and including:

(a) a generally planar roof element having forward and rearward ends, lateral sides, and sized to pass through said upper passageway, and (b) a rail assembly for attaching and positioning the roof element in juxtaposition with said upper passageway, said rail assembly comprising:

a longitudinal support track having opposite ends secured to said truck, first and second slide tracks extending lengthwise of the support track, wherein said first slide track is interconnected for relative sliding movement with said support track and with said second slide track, and said second slide track is fixedly attached to said roof element, relative sliding movement between said slide tracks and said support track enabling the roof element to pass through said upper passageway and extend outwardly of and retract inwardly into the interior of said truck, the roof element when extended being generally perpendicular to the first sidewall and disposed in generally horizontal spaced relation to the ground, and at least one closure sheet, said closure sheet being securable to the peripheral sides of the roof element when outwardly extended, said closure sheet being dimensioned to extend vertically downwardly and into closing contact with the ground.

Preferably, the roof assembly comprises a pair of laterally spaced rail assemblies, one and the other rail assembly extending along and supporting opposite lateral side portions of the roof element.

Preferably the slide tracks and support tracks are comprised of a low friction material to enable sliding movement between the components of the roof assemblies. Depending on the application the slide and support tracks are generally coextensive, one-piece, and extrusions of a suitable material, such as aluminum or a low friction plastic material.

Further, this invention is directed to a supporting mechanism disposed between a pair of sidewalls and for supporting a slide roof in juxtaposition with and movement horizontally through an entrance/exit provided in one sidewall, said supporting mechanism comprising:

first and second support sections, each said support section including upper and lower C-shaped channels interconnected by an I-beam in a manner such that the upper C-shaped channel may slide relative to the I-beam and the I-beam may slide relative to the lower C-shaped channel, the opposite end portions of the lower C-shaped channel being fixedly positioned adjacent to a respective sidewall, and the upper C-shaped channel being fixedly connected to the slide roof.

According to an aspect of this supporting mechanism, the slide roof has front and rear sides and a pair of lateral sides, the support sections are fixedly attached to and extend along opposite lateral sides of the slide roof, the upper C-shaped channel includes a central longitudinally extending guide channel which opens downwardly and receives the body of the I-beam, the opposite ends of the guide channel being provided with a respective abutment wherein to engage the opposite longitudinal ends of the I-beam and extend or retract the I-beam during extension or retraction of the slide roof, and limit means for limiting the outward extension of the I-beam relative to the lower C-shaped channel.

In a particular embodiment of this supporting mechanism, the lower C-shaped channel has a forward free end and a rearward end, the free end permitting the I-beam to extend and retract relative thereto, and the limit means comprises stop members operating between the rearward end of the I-beam and a forward end of the lower C-shaped channel.

According to another aspect of this supporting mechanism, guide rollers operate between complementary longitudinally extending faces of the lower C-shaped channel and the lower web of the I-beam, and of the upper web of the I-beam and the upper C-shaped channel.

According to an embodiment of this invention, in a mobile vehicle of the type including vehicle body movable upon the ground and comprising first and second pairs of opposed vertical sidewalls extending between a lower floor and an overlying roof and forming an interior compartment, one said vertical sidewall including a side opening communicating with the compartment, a booth system carried by the vehicle for creating a booth at a remote location, comprising:

an axially extensible slide structure, said slide structure including a plurality of longitudinally elongated beams interconnected for substantially parallel sliding movement relative to one another, and a roof section fixedly connected to one of said beams, means for connecting said slide structure to said vehicle and positioning said roof section relative to said opening and movement into and out of said interior, and wherein the beams of said slide structure are movable between a first position, wherein the roof section is disposed in said compartment and in juxtaposed parallel spaced relation with said overlying roof, and a second position, wherein said roof section, at least in part, is extended outwardly from said interior and disposed substantially perpendicularly to said one sidewall and in generally horizontal spaced relation with the ground.

According to an aspect of this embodiment, there is provided first means for extending and retracting the beams of said slide structure. Preferably, the first means for extending and retracting comprises:

an electro-hydraulic cylinder having a piston adapted to extend and retract therefrom, said cylinder being fixedly attached to said vehicle and said piston having a free end connected to said roof section, and an electronic actuator operably connected to said cylinder for controlling the extension and retraction of said piston relative to said cylinder.

Preferably, this embodiment of the invention further comprises:

an enclosure wall, and means for removably securing the enclosure wall to the roof section and to hang vertically therefrom when said roof section is in said second position.

The slide structure comprises:

a first beam, a second beam, a third beam, wherein the third beam is interconnected with each of the first and second beams for relative slidable movement, the roof section is fixedly connected to said second beam, and the means for connecting comprises a support frame, said support frame being connected to said first beam and to said vehicle wherein to position the roof section in juxtaposed relation with the overlying roof when the three beams are in the first position.

Preferably, according to this invention, the side opening has vertically spaced upper and lower edges, respectively, proximate and distal to the overlying roof, and the three beams are stacked together to form the slide structure. According to one embodiment, the support frame is fixedly secured to the vehicle, the slide structure being proximate to the lower edge of the side opening and the stack of beams associated therewith extending vertically upwardly and towards the overlying roof. According to another embodiment, the support frame is removably secured to the overlying roof, the slide structure and stack of associated beams being proximate to the upper edge of the side opening and the stack of beams thereof suspended from and extending vertically downwardly and away from the overlying roof.

According to this latter embodiment, the beams each have opposite rearward and forward end portions, the forward end portions respectively being proximate and distal to the side opening when in the beams are in the first position, and further comprising:

first engagement means operating between the rearward and forward end portions of the second and third beams for enabling the second beam to engage and sequentially pull the third beam outwardly, at least in part, from nested connection with the second beam and the second beam outwardly, at least in part, from nested connection with the first beam, the extended beam portions advancing through the side opening, outwardly of the interior, and away from the sidewall, and second engagement means operating between the forward end portions of the second and third beams for enabling the second beam to engage and sequentially push the third and first beams and into the first position wherein the beams are in nested stacked relation inside the vehicle interior In general, the roof section is generally flat, planar, and includes an outer periphery, with a predetermined portion of said outer periphery being disposed outwardly of said compartment when the roof section is deployed outwardly from the truck interior and in said second position. According to an important feature of this invention, there is provided means for forming an enclosure about and between the second wall and the lower surface of said roof section when the predetermined portion of said roof section is in said second position. In an aspect, the means for forming an enclosure comprises a vertically elongated closure structure having upper and lower ends, respectively, removably secured to the predetermined outer periphery of said roof section and proximate to the ground.

While one slide structure may be sufficient, preferably, there is provides two axially extensible slide structures, the slide structures being alike, laterally spaced and in parallel relation to one another, and the means for connecting connects the two slide structures in the interior of said vehicle in a manner to suspend the roof section below the truck roof and position the roof section relative to the side opening.

According to another preferred embodiment, a portable mobile paint booth that is transported by a truck for creating an enclosure at a remote location, said truck having an interior and a vertical sidewall, comprises:

a slide roof having a rearward end and three sides, a slide mechanism, disposed within the interior of said truck, for supporting said slide roof and enabling said slide roof to extend outwardly from and be retracted into the interior of said truck, said slide mechanism disposed in juxtaposition with the side opening of said truck, oriented transversely of said sidewall, and comprising longitudinally elongated upper and lower C-channels, and a longitudinally extending I-beam having upper and lower webs mounted for relative sliding movement in a respective C-channel, said lower C-channel fixedly connected to said truck and extending inwardly from said sidewall, and said upper C-channel fixedly attached to said slide roof, and a drop cloth which enables the enshrouding of said three sides form a vertical enclosure outwardly of the truck sidewall when the slide roof is extended.

Preferably, the portable paint booth comprises means for extending and retracting the slide roof from and into the interior of said truck. Depending on the mounting of the slide roof, the means for extending and/or retracting may comprise a wire rope and pulley system, or a hydraulic cylinder and electronic control system.

According to another preferred embodiment, there is provided a module for use in forming a booth outwardly of a side opening formed in a vertical side panel of a mobile vehicle having an interior and an overlying roof, the module comprising:

a support flange, said support flange being adapted to be removably secured to the overlying roof inside the interior of the vehicle, a stack of beams disposed in nested relative sliding relation with one another, including an intermediate I-beam of I-shaped cross-section, and upper and lower C-beams of C-shaped cross-section, the beams being generally coextensive and having forward and rearward ends, a roof section, wherein the C-beams have a back sidewall, a front provided with a continuous slot, and a central chamber, the back sidewalls of the upper and lower C-beams, respectively, being fixedly secured to the support flange and the roof section, and the front opening slots facing one another, and the I-beam includes a central web and upper and lower flanges, the web slidingly disposed in the front opening slots of the C-beams and the flanges slidingly disposed in a respective of the chambers of the C-beams, wherein the lower C-beam is adapted to slide relative to the lower flange of the I-beam and extend outwardly and away from said I-beam and then slidingly pull said I-beam outwardly and away from said upper C-beam, when moved in a first direction, and slide back into nested relation with the I-beam and push the I-beam back into nested relation with upper C-beam, when moved in a second direction opposite to said first direction.

The foregoing summary, as well as the following detailed description of preferred embodiments, will be better understood when read in conjunction with the accompanying drawing, wherein like numerals refer to like parts throughout. For illustrating the invention, there is shown in the drawings preferred embodiments, it being understood, however, that the invention is not limited to the specific methods and instrumentalities disclosed. Other objects, features and advantages of the invention will become apparent in the following detailed description of the illustrative embodiments of the invention.

DETAILED DESCRIPTION OF A PREFERRED EMBODIMENT

Figure 1:
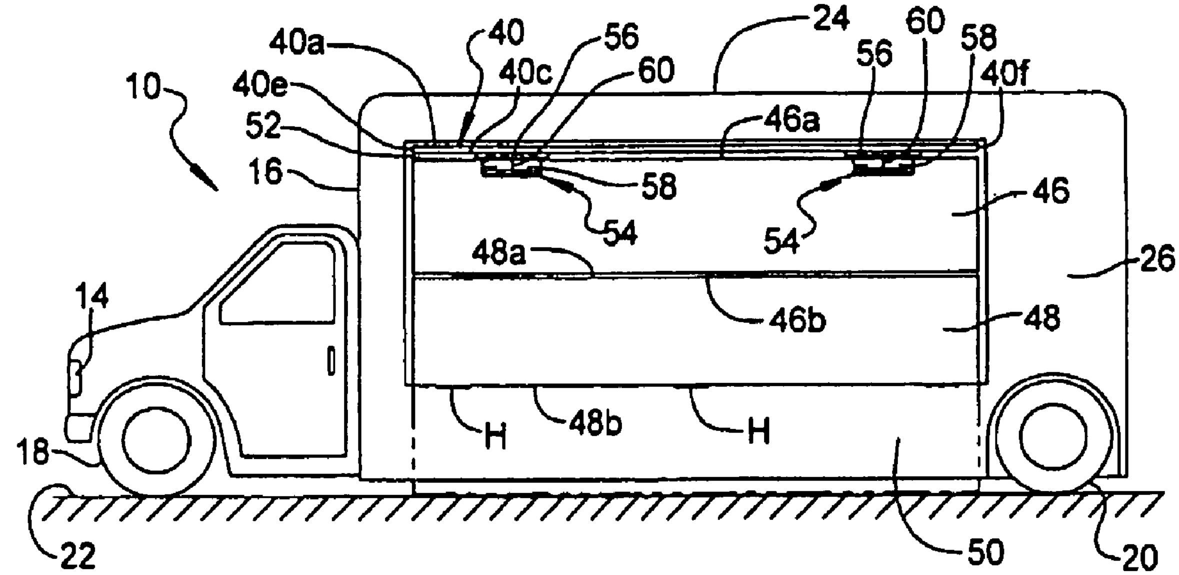
FIG. 1 is a side elevation view of a truck having deployable spray booth including a slide-out roof member, shown stored and adapted to extend/retract from a passageway in the truck sidewall, and a hinged openable closure panel, shown closed, to permit access to the truck interior, that are deployed and used with a closure wrap to form an outward enclosure booth, in accordance with the present invention.
Figure 2:
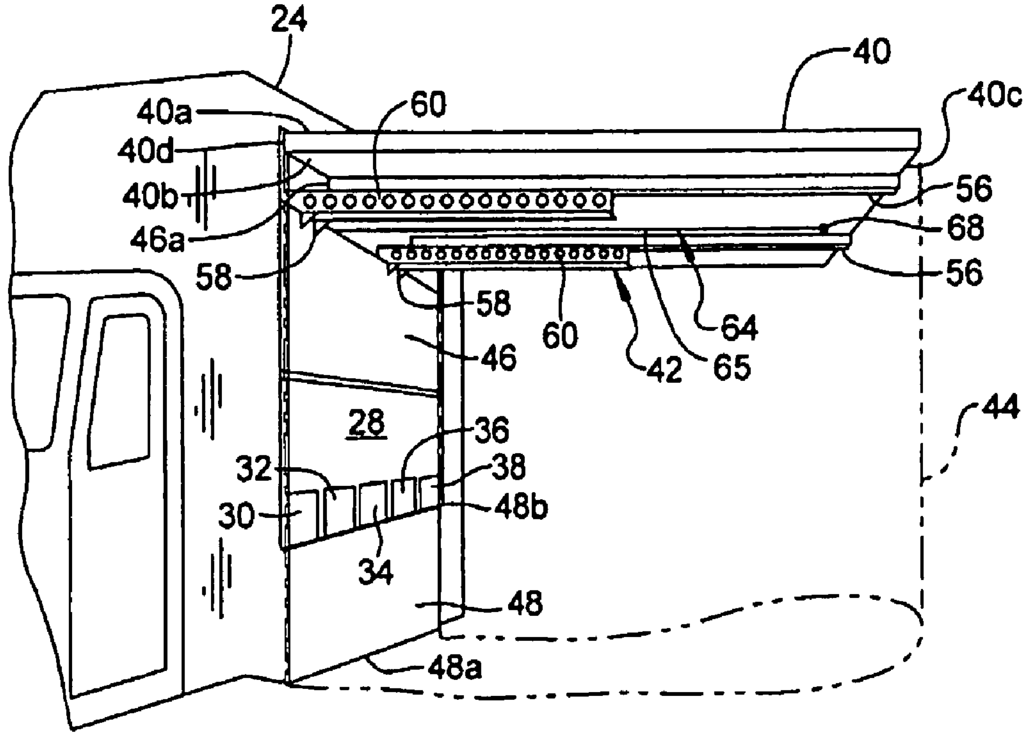
FIG. 2 is a side perspective view of the truck of FIG. 1, showing the roof member deployed and extended outwardly, the closure panel in the open position and providing access to paint apparatus in the truck, and a closure warp cooperating with the roof, the truck sidewall, the closure panel, and closure wrap to form a closure or booth structure.
Figure 3:
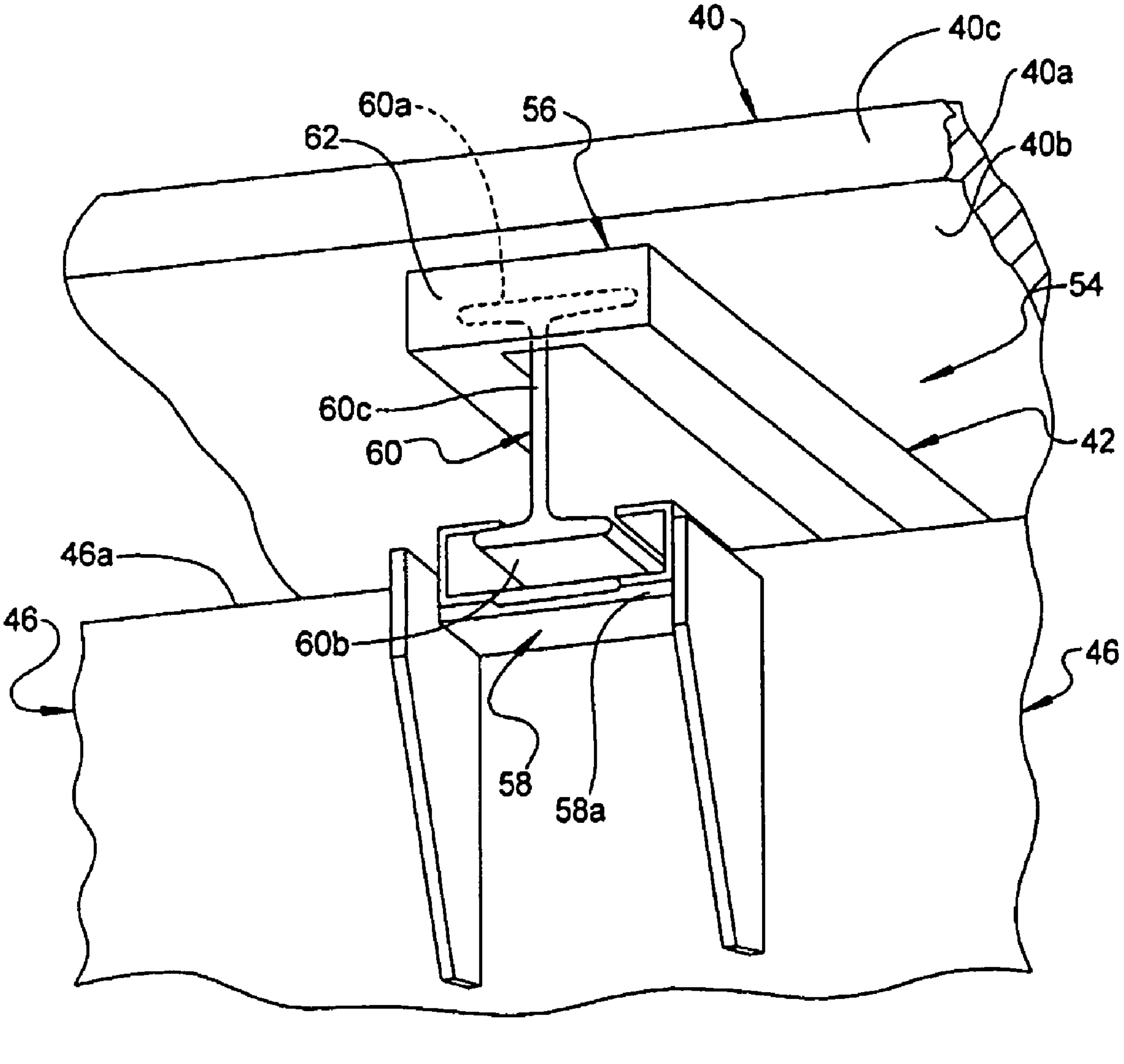
FIG. 3 is an end view of slide out structure for the roof member.

With reference to FIGS. 1-3 there is shown a truck or like mobile vehicle 10 configured to transport or otherwise carry a booth system for creating a temporary in situ enclosure at a remote location. The discussion herein is with particular reference to a portable, temporary, deployable, in situ paint booth 12, transported by a truck configured for such purpose, although the deployable booth system can be used in other applications.

Referring to FIG. 1, the truck 10 includes a forward passenger area 14, a rearward transport area 16, and pairs of forward and rearward wheels 18 and 20 for supporting the truck areas 14 and 16 above the ground 22. The rearward transport area 16 is box-like and includes a floor, a ceiling or roof 24, a pair of opposed laterally spaced sidewalls, and a pair of opposed laterally spaced forward and rearward endwalls, the sidewalls and endwalls extending vertically between the floor and ceiling and cooperating to form a box-like truck interior 28. Although only the vertical sidewall 26 is shown and discussed in detail, note should be made that the vertical sidewall opposite thereto is continuous.

As shown in FIG. 2, the truck interior 28 is appropriately configured for transporting various apparatus used in completing a painting operation. Further, the apparatus transported may include paint supplies 30, a paint spray gun or wand 32, and a pump 34, including a compressor, for powering the spray gun.

Further, and according to important features of this invention, the truck interior 28 also carries a vacuum pump 36, or other means, such as an exhaust fan, for exhausting fouled air or the like. The vacuum pump 36 is important in lowering the pressure in the paint booth and evacuating paint fumes and paint overspray from the enclosure. In some applications, the truck 10 optionally includes a heater 38 for warming the air in the paint booth enclosure formed (as described below). The heater 38 may be necessary on cold days or in cold environments to ensure proper thermal conditioning and curing of the paint and surfaces to be painted.

Figure 4:
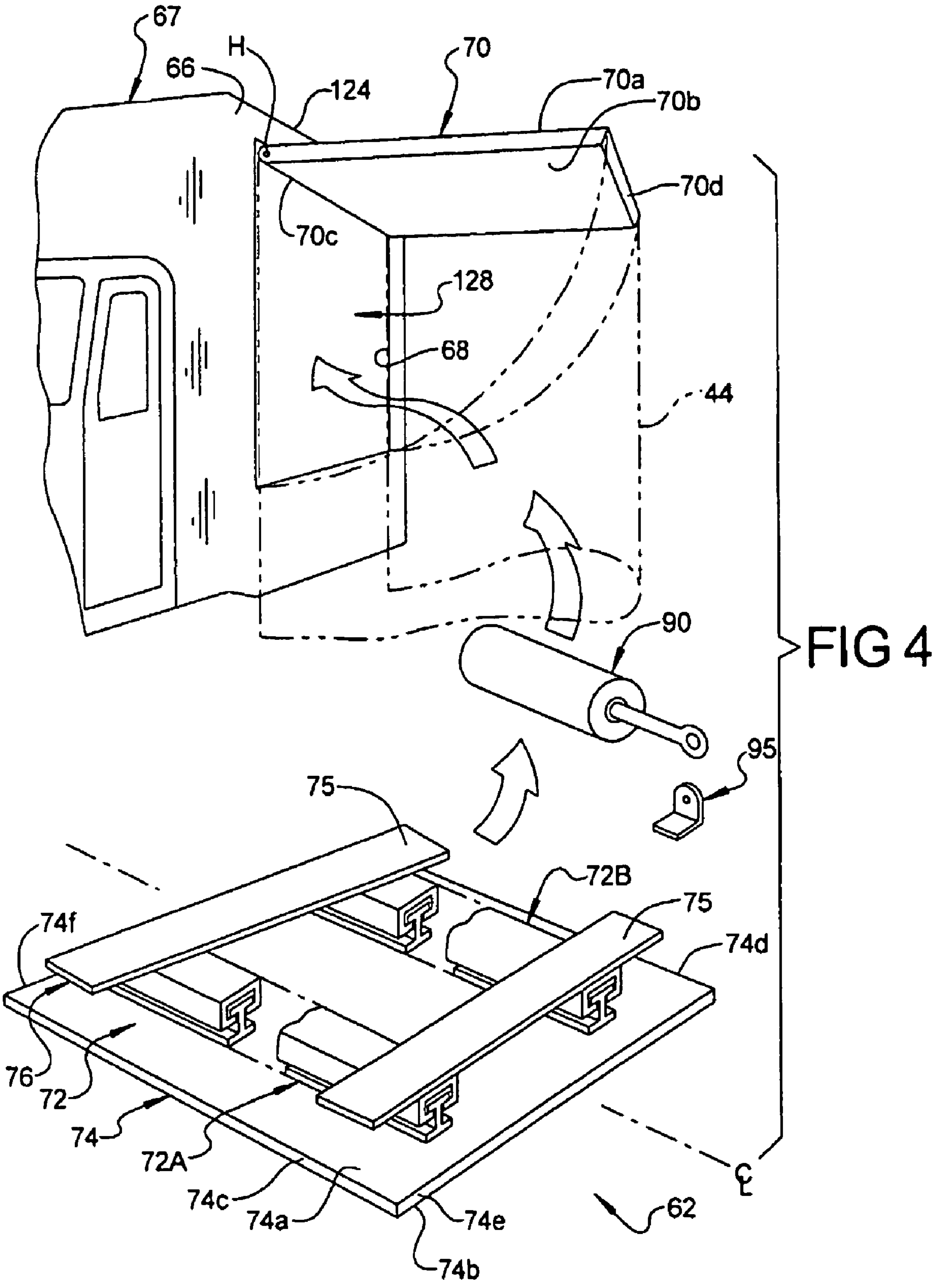
FIGS. 4-7 disclose another preferred embodiment of this invention wherein the truck includes a sidewall with an opening, an outwardly openable panel mounted to the sidewall for movement between open/closed relation with the opening, and an extensible slide structure adapted to extend/retract and to open the panel when extended, and a closure wrap secured to a roof of the slide structure to form a closure or booth structure on the sidewall of the truck.
Figure 5:
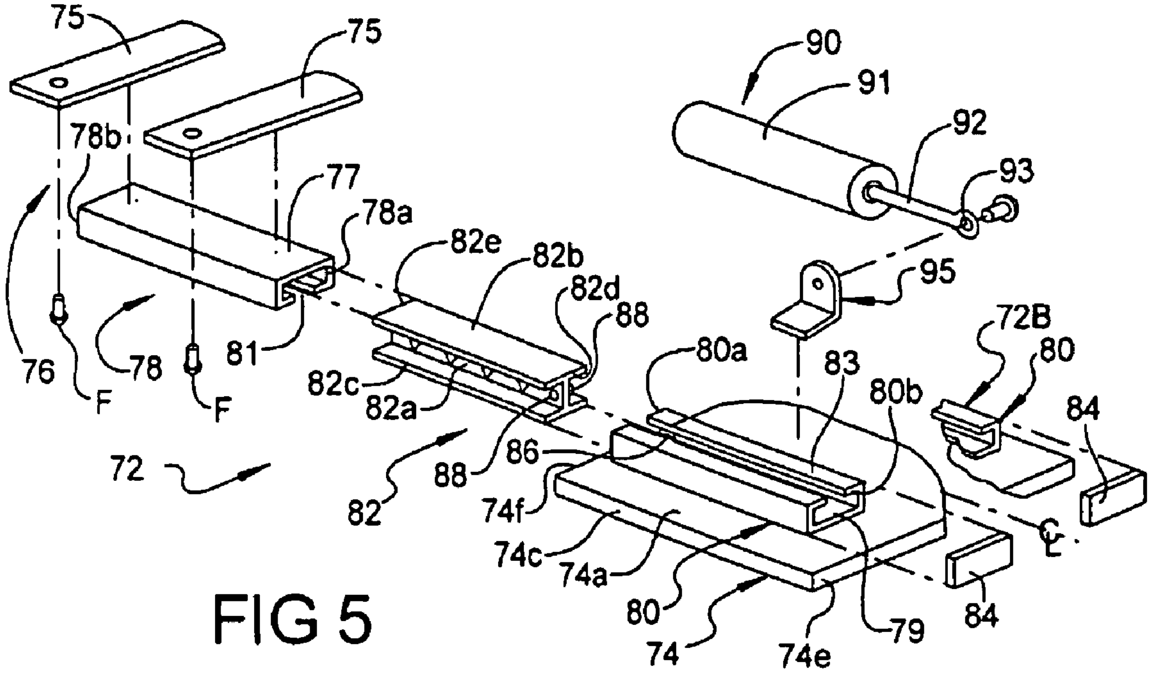
Figure 6:
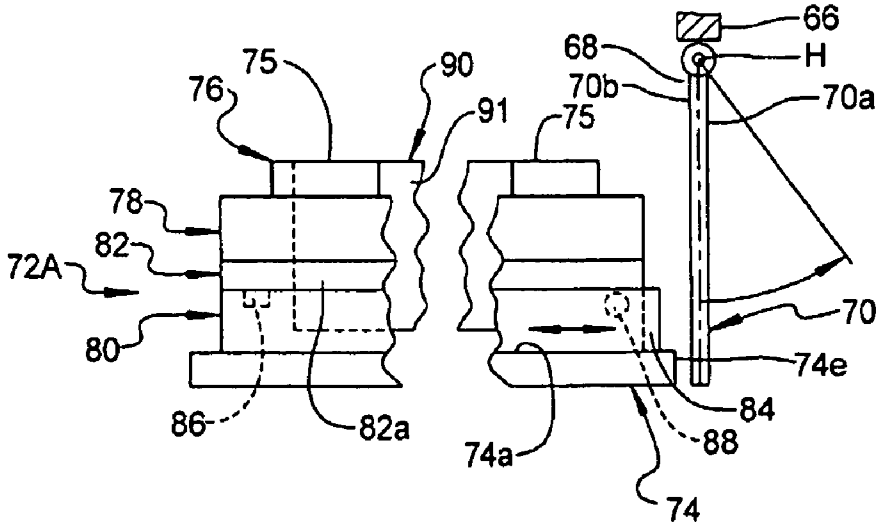

Preferably and according to this invention, the portable paint booth 12 comprises the sidewall 26, at least in part, a slide roof 40, and a slide mechanism 42 disposed within the interior 28 of the truck 10 for supporting the slide roof 40 and enabling the slide roof 40 to extend outwardly from and be retracted into the interior of the truck, and a drop cloth or wrap 44 (see FIG. 2, shown in phantom) which enshrouds and falls vertically downwardly from the slide roof 40 when extended from the interior of the truck. Preferably, the wrap is configured to form a closure booth extending vertically between the roof and the ground and with the sidewall of the truck, including the side panel 48 when in the open position. The booth 12 is conveniently stowed in the truck, as shown in FIG. 1, and rapidly deployable from the truck, or extended outwardly from the vertical sidewall 26 of the truck 10, as shown in FIGS. 2 and 4.

As shown in FIGS. 1 and 2, the sidewall 26 is formed, at least in part, by generally rectangular upper, lower, and base panels 46, 48, and 50, and an elongated rectangular passageway or slot 52. The upper panel 46 is fixed relative to the truck 10 and includes upper and lower edges **46*a* and 46*b***.

The lower panel 48 defines a planar closure member and is movable between a closed position (FIG. 1) and an open position (FIG. 2), relative to the interior 28. The lower panel 48 includes upper and lower edges **48*a* and 48*b*, with the lower edge 48*b* being connected to the base panel 50 by a hinge "H", wherein to enable the closure member 48** to swing between the closed and open positions.

In operation, when in the closed position, the lower panel or closure member 48 is generally flush with the upper panel 46 and the upper edge **48*a* is removably latched or connected to the lower edge 46*b* of the upper panel 46. When swung into the open position, the closure member 48 is generally flush with the base panel 50, vertically disposed, and the upper edge 48*a* is generally juxtaposed in closed fitting relation with the ground 22. This is shown best in FIG. 1, wherein the phantom lines show the position of the closure member 48 when in the open position and the position of the lower edge 48*a* in closely spaced generally closing juxtaposed relation with the ground 22**.

Importantly, when the closure member 48 is in the open position, the upper edge **48*a* should be as close to the ground 22 as possible wherein to minimize any air gap that may be formed therebetween. The elimination of any air gap is important in captivating or otherwise preventing the escape of paint fumes from the paint booth 12** during a paint operation.

While shown as a hinged connection, the lower panel or closure member 48 may be connected to the sidewall 26 in such a manner that the closure member may slide vertically downwardly and upwardly when moving between the closed and open positions. In the case wherein the lower panel 48 is moved into the open position, the lower edge 48*b* is as close as possible to the ground 22 wherein to minimize any air gap therebetween.

The passageway 52 defines an exit/entrance to the interior 28 of the truck 10. As shown in FIG. 1, the passageway 52 is formed between the upper edge 46*a* of the upper panel 46 and a lower edge 24*a* formed as extension of the roof or ceiling 24 of the truck 10.

The slide roof 40 is generally rectangular, thin, has parallel upper and lower surfaces 40*a* and 40*b*, forward and rearward ends 40*c* and 40*d*, and lateral sides 40*e* and 40*f*. The slide roof 40 is preferably comprised of a material that is durable, yet light in weight, and sized to pass through the entrance/exit passageway 52. For example, the slide roof may be of a polymeric material or a suitable composite.

The slide mechanism 42 is disposed, at least in part, within the interior 28 of the truck 10 for supporting the slide roof 40 and enabling the slide roof to extend outwardly from and be retracted into the interior 28 of the truck. The slide mechanism 42 is in juxtaposition with the entrance/exit passageway 52 and preferably comprises a pair of laterally spaced rail assemblies 54, each rail assembly being generally perpendicular to the upper panel 46 and extending between the opposite sidewalls.

Referring to FIGS. 2 and 3, the rail assembly 54 includes longitudinally elongated upper and lower channels 56 and 58 of C-shaped cross-section, and a longitudinally elongated beam 60 of I-shaped cross-section. The I-beam 60 includes upper and lower webs or flanges 60*a* and 60*b* and a central body 60*c*, with the upper and lower webs 60*a* and 60*b* being disposed for relative sliding movement, respectively, in the upper and lower channels 56 and 58.

Preferably the channels 56 and 58 and the I-beam 60 form slide and support tracks, which are comprised of a low friction material to enable sliding movement between the components of the roof assemblies. Depending on the application the slide and support tracks are generally coextensive, one-piece, and extrusions of a suitable material, such as aluminum or a low friction plastic material.

The lower channel 58 forms a support for the rail assembly 54 and the opposite ends of the channel are fixedly attached, respectively, to the upper panel 46 (forming a portion of the sidewall 26) and to the other sidewall. So fixed, the lower channel 58 is disposed in parallel spaced relation with and between the floor and ceiling 24 of the truck. The end 58*a* of the lower channel 58 is proximate to and opens outwardly of the entrance/exit passageway 52 to permit sliding inward and outward movement, at least in part, of the I-beam 60 relative to the channel.

The upper channel 56 is fixedly attached to the lower surface 40*b* of the slide roof 40 and includes a central guide channel that opens downwardly. The forward and rearward ends of the upper channel 56, which generally correspond to the forward and rearward ends 40*c* and 40*d* of the slide roof 40, are closed by an abutment member 62. The spaced abutment members 62 are adapted to be brought into engagement, respectively, with the forward and rearward ends of the I-beam 60.

During deployment of the slide roof 40, outward extension of the slide roof 40 will cause the upper channel 56 to slide relative the upper web 60*a* of the I-beam 60, and the subassembly of the upper channel 56 and slide roof 40 to pass outwardly of the entrance/exit 52. Further outward movement of this subassembly will bring the rearward abutment 62 of the upper channel 56 into engagement with the rearward end of the I-beam 60, causing the lower web 60*b* of the I-beam 60 to slide relative to the lower channel 58 and the I-beam, at least in part, to extend outwardly of the entrance/exit passageway 52.

Outward extension of the I-beam 60 is limited by a stop operating between the rearward end of the I-beam 60 and the forward or free end of the lower channel 58. Conversely, inward retraction of the subassembly of the slide roof 40 and the upper channel 56 causes the forward abutment 62 of the upper channel 56 to engage the forward end of the I-beam 60 and force the I-beam 60, the upper channel 56, and the slide roof 40 through the entrance/exit passageway and back into the truck interior 28.

Preferably, the paint booth 12 includes apparatus for extending the slide roof outwardly and retracting the slide roof back into the truck interior.

According to a preferred embodiment of this invention, the paint booth 12 includes a wire rope and pulley system 64, which includes a wire rope 65 and a system of pulleys connected to appropriate locations in the truck interior and on the roof 40. The wire rope 65 has one portion 68 thereof connected to a pulley on the bottom surface 40*b* of the slide roof 40, proximate to the forward end 40*c* thereof, and other portions (not shown) connected to pulleys inside the truck interior. The wire rope is used to pull the slide roof 40 back into the truck interior.

Preferably, the wire rope and pulley system 64 is operably connected to a hydraulic or pneumatic motor (not shown) which causes the pulleys to rotate and thus retract the roof. Similarly, reversal of the motor facilitates extension of the roof sections.

It should be noted that although the present invention is herein described with respect to a hydraulic or pneumatically operated rope and pulley system, other means for extending and retracting are contemplated and within the scope of the invention herein, such as other hydraulic systems and electronic systems.

As one example, the extender/retractor may use a conventional electrohydraulic cylinder, or like mechanical actuator, wherein the cylinder is fixedly secured to the truck and the free end of the reciprocating piston thereof connected to the roof. Hydraulic fluid is applied to the actuator, which in turn supplies force to move the piston back and forth and through a linear stroke, which movement causes the roof to extend or retract.

The drop cloth or wrap 44 is securable to the forward end 40*c* and peripheral sides 40*e* and 40*f* of the slide roof 40 when the roof is outwardly extended. Preferably, the drop cloth 44 is dimensioned to extend vertically downwardly from the slide roof and into closing contact with the ground. The drop cloth itself may be a conventional tarp, vinyl sheet, canvas or the like, in one or more pieces and adapted to be secured together. The drop cloth material may also comprise a thin polymeric material capable of being fittingly secured about and around irregular surfaces. Yet still, the drop cloth material may be provided with separate air pockets or channels to ensure a rigid enclosure is provided.

Although the invention is described in particularity as utilizing materials that are capable of relative sliding movement, the invention is not so limited. According to this invention, guide rollers, roller bearings and the like may be provided and operate between complementary longitudinally extending faces of the lower C-shaped channel 58 and the lower web 60*b* of the I-beam 60, and of the upper C-shaped channel 56 and the upper web 60*a* of the I-beam 60.

In another preferred embodiment according to this invention, FIGS. 4-7 depict a booth system 62 carried by a truck or like mobile vehicle 67 and providing a temporary in-situ enclosure at a remote location. Although the booth or enclosure may be used, preferably, as a temporarily erectable booth for use in in-situ painting applications, the booth may be used in other applications requiring the provision of a temporary booth or like enclosure.

As shown in FIG. 4, the truck 67 is similar to the truck 10 shown at 10 and the truck body includes a plurality of vertical walls that extend vertically between the floor and upper roof 124 of the truck compartment to define a central box-like compartment or interior 128, such as for transporting equipment. According to this embodiment, the truck 67 includes a sidewall 66, which includes a single side opening 68, affording access to the interior 28, and a side panel 70 for closing fitment about the opening 68.

The panel 70 has a shape that is complementary to the shape of the opening 68 wherein the panel will close about the opening. The panel 70 is generally rectangular, planar, thin, has inner and outer surfaces 70*a* and 70*b*, and upper and lower edges 70*c* and 70*d*. The upper edge 70*c* is hingedly connected by a hinge "H" to the sidewall 66 whereby to mount the panel 70 for swinging movement from a vertically disposed first position, in closing relation to the opening 68, and a horizontally disposed second position, projecting outwardly and perpendicularly away from the sidewall, and exposing the opening 68.

Referring to FIG. 4, the panel 70 is shown by dashed lines as movable from the first position, wherein the panel is vertically disposed, generally coplanar with the sidewall 66, and the periphery of the panel 70 closingly fits about the opening 68.

In FIG. 4, the panel 70 is shown when in the second position, wherein the panel is generally horizontally disposed, and following rotation of the panel about the hinge "H". When the panel 70 is in the second position, the opening 68 is exposed, permitting access to the interior 28 of the truck 67, the lower edge 70*d* is swung upwardly, outwardly and away from sidewall 66, and the panel 70 is substantially coplanar with the roof 24 of the truck and perpendicular to the sidewall 66 thereof.

When the roof is extended, an enclosure wall 44 (shown in phantom) is fastened to the periphery of the roof. When used as a paint booth, the enclosure 44 is dimensioned to extend substantially down to the ground wherein fumes and paint will not escape into the surrounding area.

The booth system 62 used in connection with the truck includes an extensible slide structure 72, a roof section 74 connected to the slide structure, and a support frame 76 for connecting the slide structure to the truck roof 124. Desirably, the above elements 72, 74, and 76 are secured into the interior 128 of the truck and cooperate to form a module that can be installed/removed as a unit, or removed and modified (e.g., the extended roof section changed), thereby allow users to retrofit a booth system into different truck types, sizes and shapes, as desired.

The support frame 76 comprises at least one, and preferably two, generally elongated, planar, plate members 75. The plate members 75 are secured onto the truck roof 124. While the securement is shown by threaded fasteners "F" passed through appropriate openings of the plate member 75, the securement could be other. For example, suitable receiving brackets may be provided on the roof 124, the brackets receiving and securing opposite end portions of the plate members 75.

The roof section 74 is generally flat, rectangular, and has upper and lower surfaces 74*a* and 74*b*, a pair of opposed lateral sides 74*c* and 74*d*, and a pair of opposed front and rear lateral sides 74*e* and 74*f*. In general, when mounted in the truck interior 128, the roof section 74 is generally in horizontal spaced relation to the truck roof 124. The lateral sides 74*c* and 74*d* are generally coextensive with the vertical sides of the opening 68 to allow the roof section 74 to pass through the opening 68, in horizontal spaced relation to the ground/truck roof. The lateral sides 74*e* and 74*f* form forward and rearward ends of the roof section, each proximate to an opposite lateral sidewall of the truck when the roof section is stored in the interior. That is, the roof section 74 is generally coextensive with and extends between the opposite vertical sidewalls of the truck.

The extensible slide structure 72 comprises a pair of longitudinally elongated slide assemblies 72A and 72B, each connected to the upper surface 74*a* of the roof section 74 so as to be in parallel side-by-side relation to one another and relative to a centerline thereof. The slide assemblies 72A and 72B are alike and the description that follows regarding the slide assembly 72A applies to the slide assembly 72B.

The slide assembly 72A comprises upper and lower girders or beams 78 and 80 of C-shaped cross-section ("C-beams") and an intermediate interconnecting girder or beam 82 of I-shaped cross-section ("I-beam"), each of the beams 78, 80, and 82 being longitudinally elongated and as described above. As will be described in detail below, the beams 78, 80, and 82 are slidably interconnected to one another in a nested and stacked manner and wherein the lower C-beam 80 is both slidably supported by and extends outwardly from (and retracts inwardly into) the I-beam 82. The I-beam 82 is both slidably supported by and extends outwardly from (and retracts inwardly into) the upper C-beam 78.

The upper and lower C-beams 78 and 80 have, respectively, a sidewall 77 and 79 and an opposed slot 81 and 83 extending between their opposite longitudinal ends. The I-beam 82 has a central web 82*a* and upper and lower flanges 82*b* and 82*c*. The web 82*a* is adapted to be disposed in the longitudinal slots 81 and 83 of the upper and lower beams 78 and 80. The upper and lower flanges 82*b* and 82*c* are adapted to be disposed in the channels formed in the respective beams 78 and 80, wherein the beams 78, 82, and 80 may slide longitudinally relative to one another. For weight considerations, the web 82*a* may be provided with openings or other suitable cutout areas.

The back sidewall 79 of the lower beam or channel 80 is fixedly connected atop the upper surface 74*a* of the roof section 74. Further, the lower beam 80 has rearward and forward ends 80*a* and 80*b*, a closure cap or retractor stop 84 proximate to the forward end 80*b*, and at least one extender stop 86 proximate to the rearward end 80*b*. Preferably, a pair of opposed extender stops 86 extend into the slot 83 of the channel beam, proximate to the rearward end 80*a*.

The I-beam 82 has forward and rearward ends 82*d* and 82*e*, and an extender stop 88 proximate to the forward end 82*d*. The forward end 82*d* of the I-beam 82 forms a retractor stop.

The extender stops 86 and 88 may take various forms. For example, integrally formed projections may be formed and project outwardly from opposite vertical faces of the central web 82 of the I-beam 82 and also on the facing edges that form the slot 83 of the channel 80. Additionally, the engaging projections or extender stops 86 and 88 may be provided by attachment of fasteners to each. In each, the opposed integral projections and fastener heads will engage with one another when the members are axially extended relative to one another.

The lower channel beam 80 is supported for sliding movement atop the lower flanges 82*a* of the I-beam 82 and between retracted and extended positions. In the extended position, the channel 80 moves relative to the I-beam whereupon the extenders 80 of the channel are brought into engagement with the stops 86 on web 82*a* of the I-beam 82. The forward end 80*b* of the channel 80 extends outwardly from the forward end 82*d* of the I-beam 82, and the rearward end portion 80*a* of the channel 80 remains connected to the forward end portion of the I-beam 82.

The support frame 76 is connected to the extensible slide structure 72, to form a securable module that is removably fixedly secured to the upper roof 124 of the truck 67. As shown, the two support plates 75 extend transversely of the two slide assemblies 72A and 72B, and the opposite lateral end portions of each support plate 75 are fixedly connected atop the back sidewalls 77 of the upper channel member 78, and proximate to the forward and rearward end portions 78*a* and 78*b* of the upper channel 78.

Preferably and according to this invention, an electro-hydraulic cylinder 90 and an electronic control (not shown) are provided to move and both extend and retract the roof section 74. The cylinder 90 includes a cylinder body 91 and an axially extendible and retractible piston 92 having a forward end 93 adapted to be connected to the upper surface 74*a* of the roof section 74. The electronic control is operably connected to the cylinder 90 and selective adjustment of the electronic control causes the piston 92 axially extend or retract from the cylinder body 91, as desired. Securement may be by a suitable bracket 95 connected atop the roof section and threaded or like fasteners "F" that connect the end 93 to the bracket. Securement of the bracket to the roof section may be by fasteners, a suitable adhesive, and other conventional arrangements conventionally used for such securement.

As discussed above, a tarp or wrap-around closure panel 44 is used in conjunction with the roof section 74 when extended. The wrap enables the user to form an enclosure of desired shape.

The booth system 62 and cylinder 90 are secured to the truck 10. Preferably, the booth system 62 is preassembled, as a module, and then secured to the truck roof 124. The support plates 75, attached to the back sidewalls 77 of the upper channels 78, secure the module to the truck roof. The forward end 93 of the piston 92 is connected to the upper surface 74*a* of the roof section 74, substantially in the center thereof, and adapted to move in axial reciprocating movement in generally parallel relation between the opposite lateral sidewalls of the truck interior. Actuation of the cylinder 90 will be such as to cause the piston end 93 to move axially towards and away from the sidewall 66 in generally perpendicular relation thereto.

Figure 7:
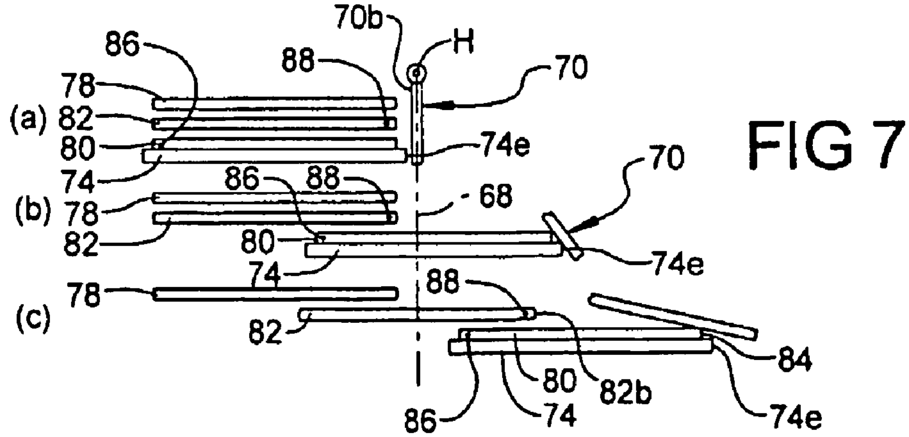

FIGS. 7(*a*), 7(*b*), and 7(*c*) are simplified drawings illustrating operation of the system herein, and the relation of the beams 78, 80 and 82 to effectuate deployment of the roof section 74 and the truck panel 70.

In use, the operator or user will actuate the cylinder 90, causing the piston 92 to extend. Due to the interconnection herein, the piston rod 92 will force the roof section 74 towards the opening 68 in the sidewall 66. As shown in FIG. 7(*a*), the forward edge 74*e* of the roof section 74 has moved into engagement with the inner surface 70*b* of the panel 70. Simultaneously, the lower channel 80 is also moved (i.e., slides) relative to the lower webs of the I-beam 82.

As shown in FIG. 7(*b*), continued actuation of the cylinder 90 and extension of the piston 92 causes the roof section 74 to pull the lower channel member 80 relative to the lower flanges of the I-beam 82, and bring the respective extender stop 86 in the channel 80 into engagement with the extender stop 88 of the I-beam 82. As the channel 80 and the plate section 74 move outwardly and away from the I-beam, the forward end of the roof section causes the panel 70 to rotate upwardly from vertical closing relation with the opening 68 in the truck sidewall 66.

As shown in FIG. 7(*c*), continued actuation of the cylinder 90 simultaneously moves the channel 80 and the engagement of the extenders 86 and 88 cause the I-beam 82 to be pulled outwardly by a predetermined amount from the upper channel 78. Further, the outward movement of the channel 80 rotates the panel 70 upwardly and outwardly wherein the panel 70 is substantially horizontal and in parallel spaced relation with the ground and the truck roof 124. Additionally, the engaged extender stops 86 and 88 pull the I-beam 82 outwardly and away from the upper channel 78

The wrap 44, or wraps, are then secured as desired about the outer periphery of the extended roof, wherein to form a temporary enclosure of booth.

When the booth or enclosure is no longer needed, the steps are reversed. The wrap 44 is removed and the electronic control actuated to retract the piston 92 into the cylinder body 91. The piston 92 pulls the roof section 74 back towards the sidewall of the truck, simultaneously bringing the forward end 80*b* and retractor cap 84 of the lower channel 80 into engagement with the forward end 82*d* or retractor stop of the I-beam 82. Further retraction of the piston 92 progressively pulls the roof section 74 and channel section 80 connected thereto back into the interior 28 and pushes the I-beam 82 back into the upper channel 78, during which retraction the truck panel 70 progressively rotates downwardly and back into closing relation with the opening 68 in the sidewall 66.

Desirably, the above elements are secured into the interior 28 of the truck and cooperate to form a module that can be modified and thereby allow users to retrofit various truck types, as desired, with a booth system.

The foregoing description and accompanying drawings disclose a preferred embodiment of my invention but it will be understood that the disclosure is merely illustrative and that changes in the invention may be made as are fairly within the scope and spirit of the following claims.

I claim:

1. In a mobile vehicle of the type including vehicle body movable upon the ground and comprising first and second pairs of opposed vertical sidewalls extending between a lower floor and an overlying roof and forming an interior compartment, one said vertical sidewall including a side opening communicating with the compartment, a booth system carried by the vehicle for creating a booth at a remote location, comprising:

- an axially extensible slide structure, said slide structure including a plurality of longitudinally elongated beams interconnected for substantially parallel sliding movement relative to one another, and a roof section fixedly connected to one of said beams, means for connecting said slide structure to said vehicle and positioning said roof section relative to said opening and movement into and out of said interior, and wherein
- the beams of said slide structure are movable between a first position, wherein the roof section is disposed in said compartment and in juxtaposed parallel spaced relation with said overlying roof, and a second position, wherein said roof section, at least in part, is extended outwardly from said interior and disposed substantially perpendicularly to said one sidewall and in generally horizontal spaced relation with the ground.

2. The invention as claimed in claim 1, further comprising means for extending and retracting the beams of said slide structure.

3. The invention as claimed in claim 2, wherein said means for extending and retracting comprises:

an electro-hydraulic cylinder having a piston adapted to extend and retract therefrom, said cylinder being fixedly attached to said vehicle and said piston having a free end connected to said roof section, and an electronic actuator operably connected to said cylinder for controlling the extension and retraction of said piston relative to said cylinder.

4. The invention as claimed in claim 2, wherein said means for extending and retracting is selected from a group consisting of hydraulic power, electrical power, pneumatic power, and structure that is manually pulled and pushed.

5. The invention as claimed in claim 1, further comprising:

an enclosure wall, said enclosure wall securable to the roof section such that the enclosure wall hangs vertically therefrom when said roof section is in said second position.

6. The invention as claimed in claim 1, further wherein said slide structure comprises a first beam, a second beam, and a third beam, said third beam being interconnected with each of said first and second beams for relative slidable movement therebetween, and said roof section being fixedly connected to said second beam, and said means for connecting comprises a support frame, said support frame being connected to said first beam and to said vehicle wherein to position the roof section in juxtaposed relation with the overlying roof when the three beams are in the first position.

7. The invention as claimed in claim 6, and further wherein the side opening has vertically spaced upper and lower edges, respectively, proximate and distal to the overlying roof, the three beams of said slide structure are stacked together to form the slide structure, and said support frame is removably secured to said overlying roof, said slide structure and stack of associated beams being proximate to the upper edge of said side opening and the stack of beams thereof extending vertically downwardly and away from said overlying roof.

8. The invention as claimed in claim 6, and further wherein the side opening has vertically spaced upper and lower edges, respectively, proximate and distal to the overlying roof, the three beams of said slide structure are stacked together to form the slide structure, and said support frame is fixedly secured to the vehicle, said slide structure being proximate to the lower edge of said side opening and the stack of beams associated therewith extending vertically upwardly and towards the overlying roof.

9. The invention as claimed in claim 6, further wherein said beams each have opposite rearward and forward end portions, the forward end portions respectively being proximate and distal to the side opening when the beams are in the first position, and further comprising first means for engagement between the rearward and forward end portions of the second and third beams, the first means for engagement enabling the second beam to engage and sequentially pull the third beam outwardly, at least in part, from nested connection with the second beam and the second beam outwardly, at least in part, from nested connection with the first beam, the extended beam portions advancing through the side opening, outwardly of the interior, and away from the sidewall, and second means for engagement between the forward end portions of the second and third beams, the second means for engagement enabling the second beam to engage and sequentially push the third and first beams and into the first position wherein the beams are in nested stacked relation inside the vehicle interior.

10. The invention as claimed in claim 1, and further wherein said roof section is generally flat, planar, and includes an outer periphery, a predetermined portion of said outer periphery being disposed outwardly of said compartment when said roof section is in said second position, and further comprising:

means for forming an enclosure about and between said one sidewall and the lower surface of said roof section.

11. The invention as claimed in claim 10, wherein said means for forming an enclosure comprises a vertically elongated closure structure having upper and lower ends, respectively, removably secured to the predetermined outer periphery of said roof section and proximate to the ground.

12. The invention as claimed in claim 2, wherein the beams of said slide structure are substantially coextensive, and further wherein a first beam and a second beam of the plurality of beams, each comprising an elongated channel of C-shaped cross-section, each beam including a backwall, a frontwall having a continuous slot extending between opposite ends, and a central chamber extending between opposite ends and communicating with the slot, and a third beam of the plurality of beams has an I-shaped cross-section formed by a center web slidably received within the continuous slots of the first and second beams, and upper and lower slidably nested within respective of the central chambers of the first and second beams.

13. The invention as claimed in claim 1, further comprising: two axially extensible slide structures, said slide structures being alike, laterally spaced and in parallel relation to one another, and said means for connecting connects the two slide structures in the interior of said vehicle in a manner to position the roof section relative to the side opening.

14. The invention as claimed in claim 13, further comprising:

a closure panel, said closure panel having an outer periphery adapted to closingly fit about the side opening and upper and lower edges juxtaposed with the upper and lower edges of the side opening when the closure panel is fit thereabout, means for mounting the upper edge of the closure panel to the sidewall and the closure panel for pivoting movement between a closed position, when the slide structure is in the first position, and an open position, when the slide structure is in the second position, and wherein said slide structure being adapted to engage and pivot the closure panel between said closed and open positions when the slide structure is in said first and second positions.

15. A portable mobile paint booth that is transported by a truck for creating an enclosure at a remote location, said truck having an interior and a vertical sidewall, the vertical sidewall having a side opening, said paint booth comprising:

a slide roof having a rearward end and three sides, a slide mechanism, disposed within the interior of said truck, for supporting said slide roof and enabling said slide roof to extend outwardly from and be retracted into the interior of said truck, said slide mechanism disposed in juxtaposition with the side opening of said truck, oriented transversely of said sidewall, and comprising longitudinally elongated upper and lower C-channels, and a longitudinally extending I-beam having upper and lower webs mounted for relative sliding movement in a respective C-channel, said lower C-channel fixedly connected to said truck and extending inwardly from said sidewall, and said upper C-channel fixedly attached to said slide roof, and a drop cloth which enables the enshrouding of said three sides when the slide roof is extended.

16. The portable paint booth as claimed in claim 15, further comprising means for extending and retracting the slide roof from and into the interior of said truck.

17. The portable paint booth as claimed in claim 16, wherein said lower C-channel is fixedly attached to said sidewall, at least in part, and said means for extending and retracting comprises a wire rope and pulley system, including a pulley connected to the interior of said truck and a wire rope having opposite end portions, respectively, fixedly connected to the slide roof and associated with the pulley.

18. The portable paint booth as claimed in claim 16, wherein said means for extending and retracting comprises a hydraulic system and an electronic system.

19. The portable paint booth as claimed in claim 15, wherein the C-channels and I-beam are comprised of a low friction material to enhance relative sliding movement between the beams.

20. The portable paint booth as claimed in claim 15 wherein the upper C-channel and I-beam include complementary pairs of engageable stop members which alternately engage with one another when the upper C-channel moves in opposite first and second directions relative to the I-beam, movement in the first direction first pulling the upper C-channel outwardly and away from the I-beam until the first stops engage with one another and then pulling the engaged pair away from the lower C-channel and deploying the slide roof into the extended position for mounting the drop cloth, and movement in the second direction pushing the upper C-channel towards the lower C-channel until the second stops engage with one another and then pushing the pair back into nested relation with the lower C-channel.

21. A module for use in forming a booth outwardly of a side opening formed in a vertical side panel of a mobile vehicle having an interior and an overlying roof, said module comprising:

a support flange, said support flange being adapted to be removably secured to the overlying roof inside the interior of the vehicle, a stack of beams disposed in nested relative sliding relation with one another, including an intermediate I-beam of I-shaped cross-section, and upper and lower C-beams of C-shaped cross-section, the beams being generally coextensive and having forward and rearward ends, and a roof section, the C-beams having a back sidewall, a front provided with a continuous slot, and a central chamber, the back sidewalls of the upper and lower C-beams, respectively, being fixedly secured to the support flange and the roof section, and the front opening slots facing one another, and the I-beam includes a central web and upper and lower flanges, the web slidingly disposed in the front opening slots of the C-beams and the flanges slidingly disposed in a respective of the chambers of the C-beams, wherein said lower C-beam is adapted to slide relative to the lower flange of the I-beam and extend outwardly and away from said I-beam and then slidingly pull said I-beam outwardly and away from said upper C-beam, when moved in a first direction, and slide back into nested relation with the I-beam and push the I-beam back into nested relation with upper C-beam, when moved in a second direction opposite to said first direction.

* * * * *